(12) United States Patent
Eryilmaz et al.

(10) Patent No.: US 11,566,203 B2
(45) Date of Patent: Jan. 31, 2023

(54) SUB-STOICHIOMETRIC METAL NITRIDES

(71) Applicant: UCHICAGO ARGONNE, LLC, Chicago, IL (US)

(72) Inventors: Osman Levent Eryilmaz, Plainfield, IL (US); Vanessa DaSilva, Countryside, IL (US); Ali Erdemir, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 67 days.

(21) Appl. No.: 17/033,014

(22) Filed: Sep. 25, 2020

(65) Prior Publication Data

US 2021/0095224 A1    Apr. 1, 2021

Related U.S. Application Data

(60) Provisional application No. 62/906,345, filed on Sep. 26, 2019.

(51) Int. Cl.

| | | |
|---|---|---|
| *C10M 177/00* | (2006.01) | |
| *C10M 101/02* | (2006.01) | |
| *B01J 37/02* | (2006.01) | |
| *B01J 27/22* | (2006.01) | |
| *B01J 27/24* | (2006.01) | |
| *C23C 30/00* | (2006.01) | |
| *C10N 60/00* | (2006.01) | |
| *C10N 70/00* | (2006.01) | |
| *C10N 30/06* | (2006.01) | |
| *B82Y 30/00* | (2011.01) | |

(52) U.S. Cl.
CPC ............ *C10M 177/00* (2013.01); *B01J 27/22* (2013.01); *B01J 27/24* (2013.01); *B01J 37/0201* (2013.01); *C10M 101/02* (2013.01); *B82Y 30/00* (2013.01); *C10N 2030/06* (2013.01); *C10N 2060/00* (2013.01); *C10N 2070/00* (2013.01); *C23C 30/005* (2013.01); *C23C 2222/00* (2013.01)

(58) Field of Classification Search
CPC .............. C10M 177/00; C10M 101/02; C10M 2201/0413; C10M 2201/05; C10M 2201/061; B01J 27/22; B01J 27/24; B01J 37/0201; C23C 28/046; C23C 28/044; C23C 28/042; C23C 2222/00; C23C 30/005; B82Y 30/00; C10N 2060/00; C10N 2020/06; C10N 2030/06; C10N 2040/08; C10N 2050/025; C10N 2070/00
See application file for complete search history.

(56) References Cited

U.S. PATENT DOCUMENTS

| | | |
|---|---|---|
| 6,548,173 B2 | 4/2003 | Erdemir et al. |
| 7,211,323 B2 | 5/2007 | Erdemir et al. |
| 7,353,525 B1 | 4/2008 | Dorbeck et al. |
| 7,509,993 B1 | 3/2009 | Turng et al. |

(Continued)

*Primary Examiner* — Vishal V Vasisth
(74) *Attorney, Agent, or Firm* — Foley & Lardner LLP

(57) ABSTRACT

A non-stoichiometric nanocomposite coating and method of making and using the coating. The non-stoichiometric nanocomposite coating is disposed on a base material, such as a metal or ceramic; and the nanocomposite consists essentially of a matrix of an alloy selected from the group of Cu, Ni, Pd, Pt and Re which are catalytically active for cracking of carbon bonds in oils and greases and a grain structure selected from the group of borides, carbides and nitrides.

15 Claims, 15 Drawing Sheets

(56) References Cited

U.S. PATENT DOCUMENTS

| | | |
|---|---|---|
| 7,846,556 B2 | 12/2010 | Erdemir et al. |
| 7,961,427 B2 | 6/2011 | Dorbeck et al. |
| 9,255,238 B2 | 2/2016 | Erdemir et al. |
| 9,845,441 B2 | 12/2017 | Erdemir et al. |
| 2004/0131894 A1* | 7/2004 | Erdemir .................. C23C 30/00 428/698 |
| 2009/0155479 A1 | 6/2009 | Xiao et al. |
| 2013/0085088 A1* | 4/2013 | Erdemir .................. B01J 27/24 508/105 |
| 2016/0145531 A1* | 5/2016 | Erdemir ............... C10M 103/04 508/105 |
| 2018/0163155 A1* | 6/2018 | Erdemir .................. B01J 27/24 |

\* cited by examiner

SUB-STOICHIOMETRIC METAL NITRIDES

CROSS-REFERENCE TO RELATED APPLICATIONS

This application claims the benefit of and priority to U.S. Provisional Patent Application No. 62/906,345, filed on Sep. 26, 2019, the content of which is herein incorporated by reference.

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE INVENTION

The present invention relates to coating materials and methods of manufacture thereof. More particularly, the invention relates to catalytically active nanocomposite coatings and methods of manufacture to provide low friction surface layers for a variety of lubricant uses, such as for engines.

BACKGROUND OF THE INVENTION

Current engine oils and greases typically include additives to enhance lubrication properties. Such additives include, for example, the well-known additives ZDDP and MoTDC. However, these additives are very harmful to the effective operation of catalytic converters and other after treatment devices for engines using such additive-containing lubricants. The result is incomplete and ineffective operation of such devices which causes environmental pollution. Consequently, there is a substantial need to eliminate use of such additives in lubricants while still providing excellent engine operation and wear resistance and avoiding environmental pollution. Various materials have been investigated for use as possible low friction materials (i.e., those with a kinetic coefficient of friction ("CoF") less than 0.1 in boundary lubricated conditions) and ultra-low friction materials (superlubricious materials, i.e. those with a kinetic coefficient of friction less than 0.001). However, there remains a need for true ultra-low friction materials that achieve superlubricity under ambient or more feasible conditions.

SUMMARY OF THE INVENTION

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

One embodiment relates to a super lubricious apparatus. The apparatus comprises a substrate and a nanocomposite coating on the substrate. The nanocomposite coating consists essentially of a matrix of a catalytically active element embedded in the matrix, the matrix selected from nitrides, borides, carbides, and nitrocarbides of Cu, Ni, Pd, Pt and Re and mixtures thereof and the grains selected from the group of transition metal carbides, transition metal nitrides, transition metal carbo-nitrides, transition metal borides, refractory metal carbides, refractory metal nitrides, refractory metal carbo-nitrides, refractory metal borides. The apparatus further comprises a hydrocarbon lubricant. A carbon film is disposed between the nanocomposite coating and the hydrocarbon lubricant, thereby lubricating the nanocomposite coating and the substrate.

Another embodiments relates to a method for lubricating materials in wear contact, comprising the steps of: providing a base material; disposing a nanocomposite coating on the base material, the nanocomposite consisting essentially of about 1% to 10% by weight a microstructural matrix of a catalytically active alloy with about 90% to 99% by weight grains embedded in therein, the microstructural matrix selected from the group of Cu, Ni, Pd, Pt and Re and mixtures thereof and the grains selected from the group of transition metal carbides, transition metal nitrides, transition metal carbo-nitrides, transition metal borides, refractory metal carbides, refractory metal nitrides, refractory metal carbo-nitrides, refractory metal borides; disposing an oil on the nanocomposite coating; engaging the nanocomposite coating with a surface, the oil disposed therebetween; cracking carbon bonds of the oil; and forming a carbon film disposed between the coating and the layer, thereby lubricating the nanocomposite coating and underlying base material.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
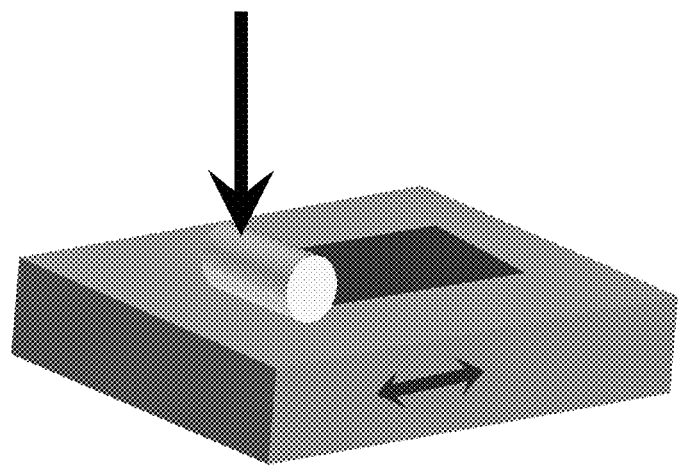
FIG. 1 is a schematic of a friction test setup.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF THE PREFERRED EMBODIMENTS

The invention is directed to methods of preparation of catalytically active nanocomposite coatings. Prior catalytic coatings, such as described in U.S. Pat. Nos. 9,255,238 and 9,845,441, describe stoichiometric formulations that provide improved lubricity over various existing liquid lubricants. Described herein is a non-stoichiometric coating that exhibits vastly improved (more than 5× improvement) over those previously described materials. The non-stoichiometric coating may be part of a super lubricious apparatus comprising the non-stoichiometric coating on a substrate, a counter surface, and liquid lubricant.

In one embodiment, the non-stoichiometric coating is deposited on a substrate. The substrate may be any suitable material, for example suitable materials compatible with vacuum based depositions. In certain embodiments ferrous and non-ferrous metals may be used as a substrate. In certain embodiments, the substrate is a material suitable to deposition of the non-stoichiometric coating as described herein. In one particular implementation, the substrate is steel, such as hardened steel with a hardness of 5-6 GPa or higher (e.g., 52100 Alloy Steel).

The liquid lubricant provides both a source of friction reduction, though is not typically associated with ultra-low friction or superlubricity, and a feedstock for the catalytic reaction. The liquid lubricant may be selected from the group consisting of, for example, long-chain alkanes. In particular embodiments, the liquid lubricant is a polyglycol or polyalkylene glycol, such as for use as brake fluid. The non-stoichiometric coating catalyzes a cracking of hydrocarbon chains into smaller carbon compounds, including the formation of diamond-like carbon ("DLC"). The DLC is formed, such as small nanocrystallites suspended in the liquid lubricant or as a solid at the surface of either the non-stoichiometric coating or the opposing surface. In one embodiment, the liquid lubricant is essentially free of additives.

The non-stoichiometric coating may comprise a nanocomposite consisting of a matrix and particles in the matrix. The non-stoichiometric coating may include one or more catalytically active elements. The catalytically active element forms a matrix. In certain embodiments, the catalytically active element is selected from one or more of Cu, Ni, Pd, Pt, Re, and/or combinations thereof. The catalytically active element is selected to be catalytic for a carbon chain cracking of hydrocarbons, such as the liquid lubricant as described below, to create a diamond-like carbon material. One of skill in the art will appreciate that contact pressure, sliding speed, and temperature can impact the reaction rate or occurrence.

The non-stoichiometric coating further comprises particles deposited within the matrix. In one embodiment, the non-stoichiometric coating is a solid conformal coating with non-stoichiometric hard grains and homogenously distributed catalytic soft grains. In one embodiment, the particles are one or more of nitride, carbide, nitro-carbide, and/or borides. Further, in certain embodiments the nitride, carbide, nitro-carbide, and/or boride is of a transition and/or refractory element (Nb, Mo, Ta, W, Re). In certain embodiments the thickness of the non-stoichiometric coating is 0.5 to 2 microns.

The non-stoichiometric coating comprises $R_x$-$M_y$-$Cat_z$, where R is a transition metal or refractory metal with M as nitrogen, carbon, nitrogen and carbon, or boron and, in the case of M being carbonitride, then y is equal to y1+y2, where the carbonitride is $C_{(y1)}N_{(y2)}$. The matrix of catalytic elements comprises between 3 and 10 wt % of the non-stoichiometric coating. In one embodiment, nitrogen reactive gas flow was reduced, such as from a standard 80 sccm to 20 for formation of the non-stoichiometric coating.

The non-stoichiometric coating may be formed on the substrate by a variety of processes including physical vapor deposition such as sputtering, arc PVD, or the like. In one embodiment, the process is as described in U.S. Pat. Nos. 9,255,238 and 9,845,441 with ¼ as much nitrogen gas supplied.

EXPERIMENTAL EXAMPLES

FIG. 1 shows a test condition utilized for a series of tests of a non-stoichiometric nitride material. In one experiment, a cylinder on flat test (such as illustrated in FIG. 1) was utilized. The uncoated barrel shaped cylinder 1010 has a 4.3 mm dia. In this experiment. The opposing material 1020 is VN—Cu coated 52100 Alloy steel (smooth—9 nm). The experiment utilized the following conditions: Temp: 100° C.; Load: 350 N; Speed: 5 Hz; Stroke: 6 mm; Lubricants: Hydraulan® 404, DOT 3, and DOT 4 brake fluids; Duration: 2 hours.

Figure 2:
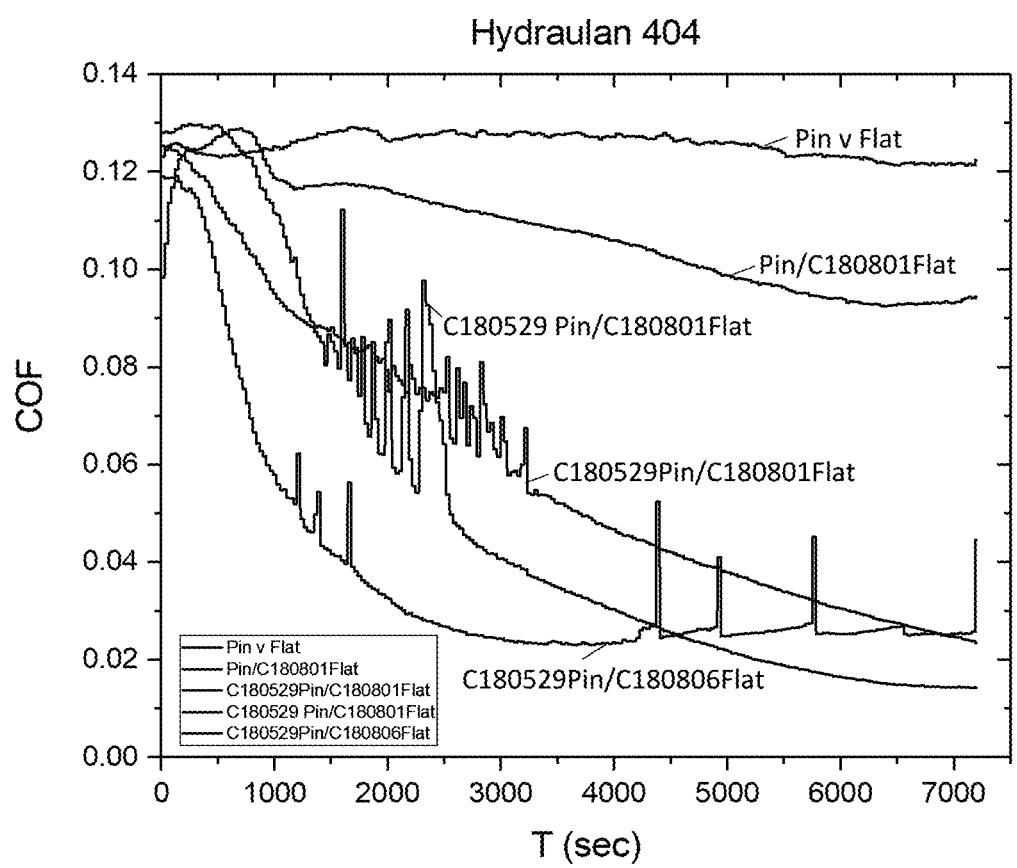
FIG. 2 is a graph of the CoF over time for different combinations of materials with Hydraulan® 404 as the liquid lubricant.
Figure 3A:
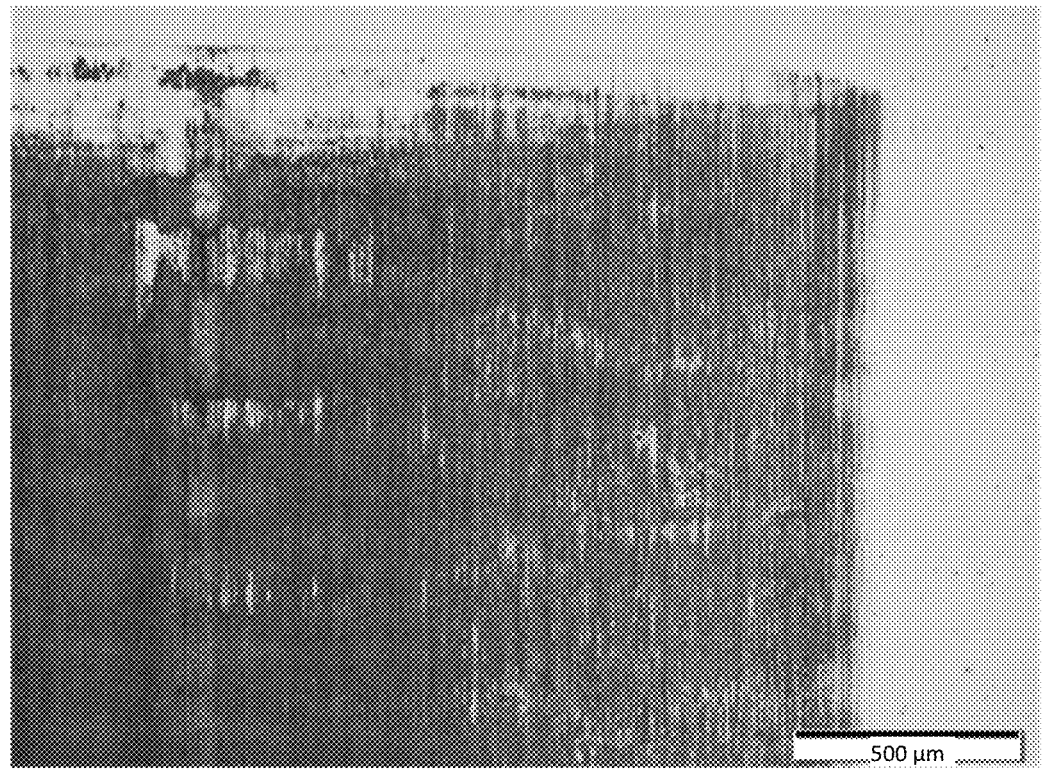
FIGS. 3A-3B show native, uncoated steel surface and the results of the wear experiments with Hydraulan® 404 as the liquid lubricant.
Figure 3A:
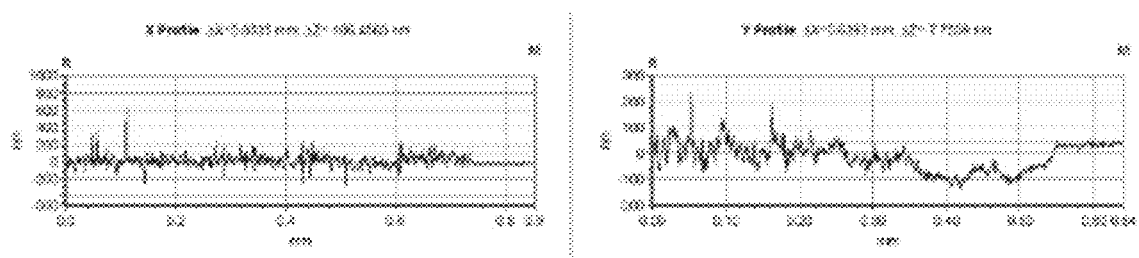
Figure 3B:
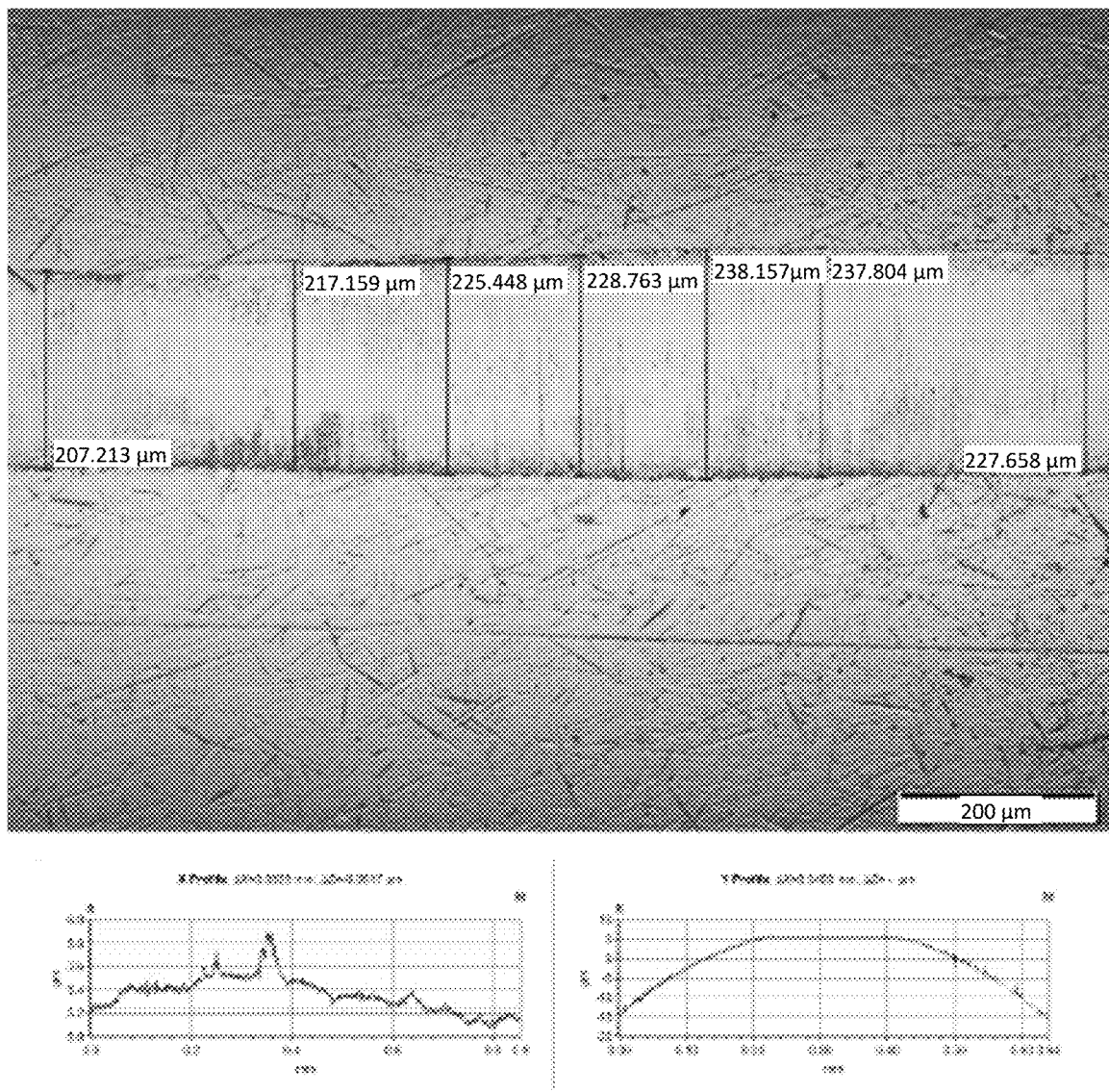
Figure 3C:
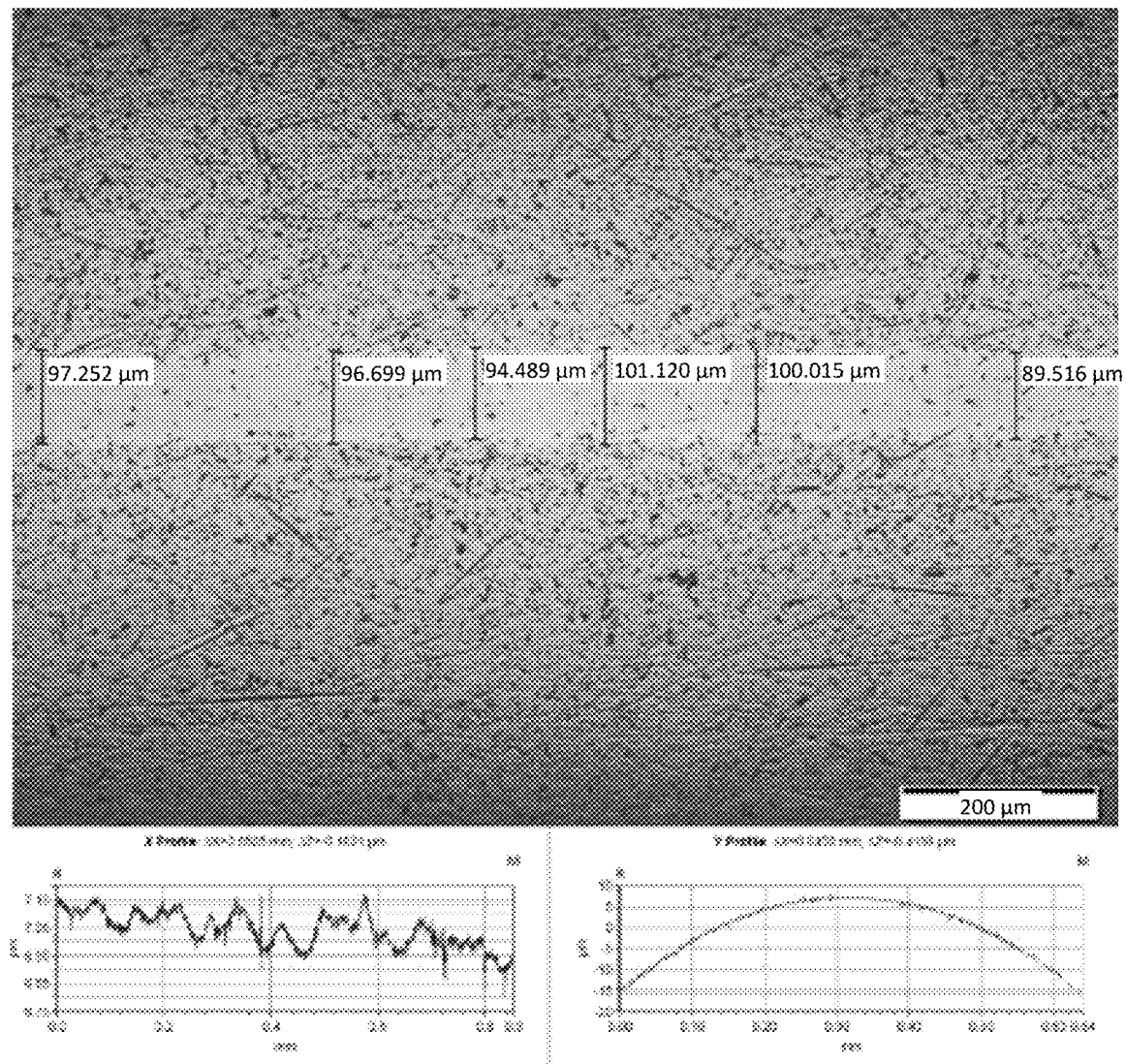
FIGS. 3C-3D show an embodiment of non-stoichiometric nitride coated steel surface and the results of the wear experiments with Hydraulan® 404 as the liquid lubricant.
Figure 3D:
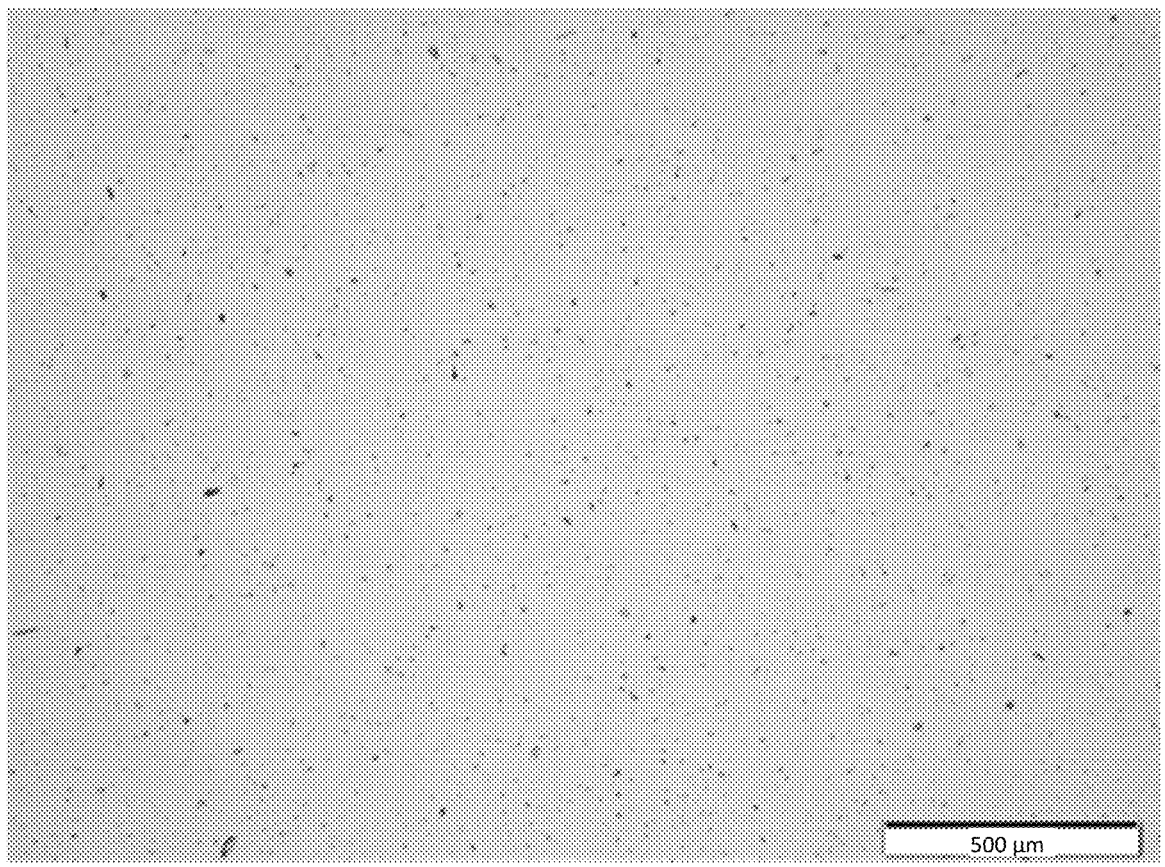

In one embodiment, the liquid lubricant was Hydraulan® 404. FIG. 2 is a graph of the CoF over time for different combinations of materials with Hydraulan® 404. FIG. 3A-3B show native, uncoated steel surface and the results of the wear experiments with Hydraulan® 404. FIGS. 3C-3D show an embodiment of non-stoichiometric nitride coated steel surface and the results of the wear experiments with Hydraulan® 404.

Figure 4:
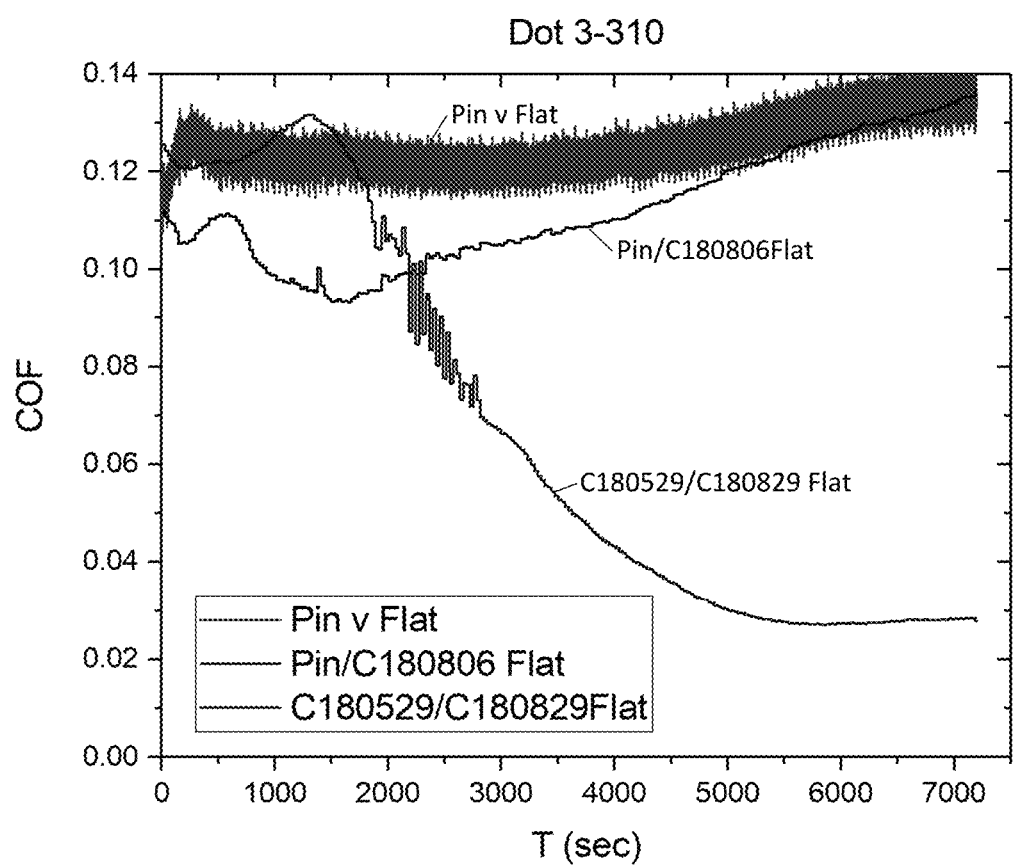
FIG. 4 is a graph of the CoF over time for different combinations of materials with DOT 3-310 as the liquid lubricant.
Figure 5A:
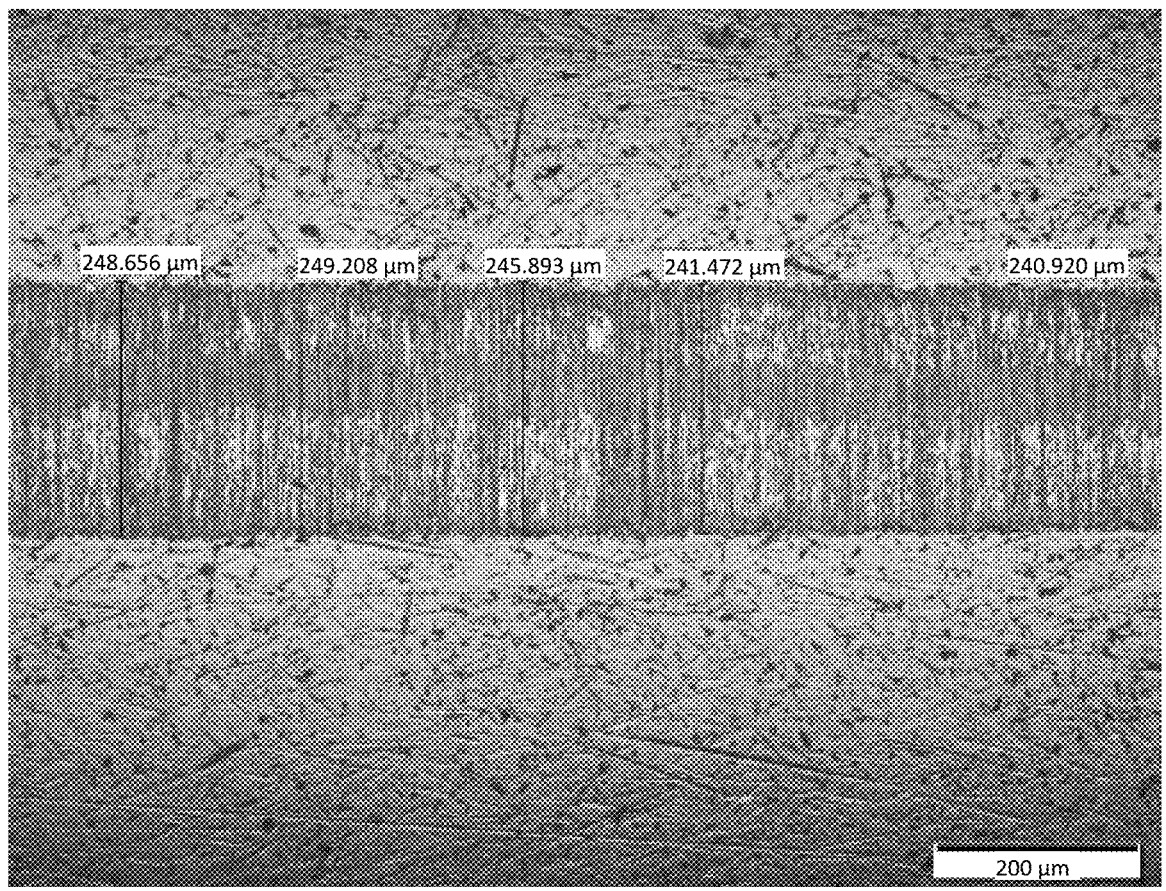
FIGS. 5A-5B show a native, uncoated steel surface and the results of the wear experiments with DOT 3-310 as the liquid lubricant.
Figure 5B:
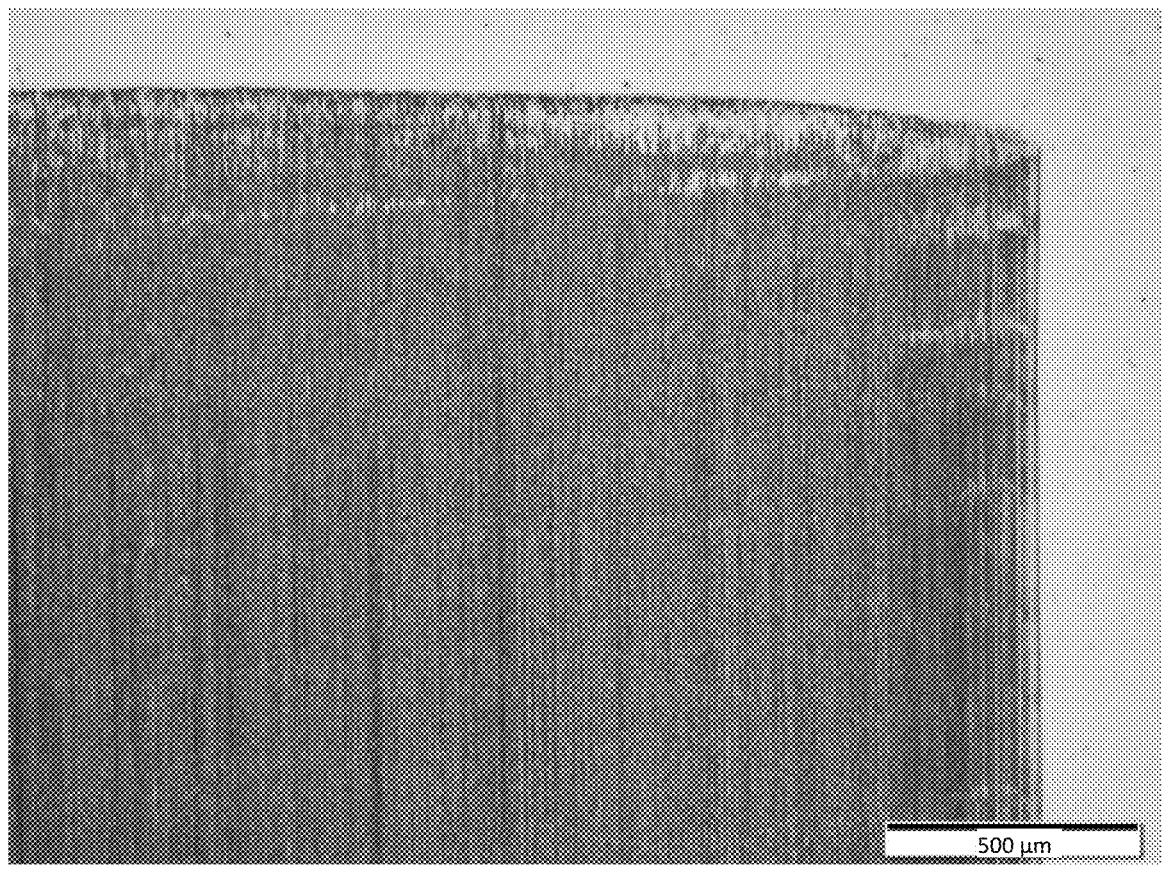
Figure 5C:
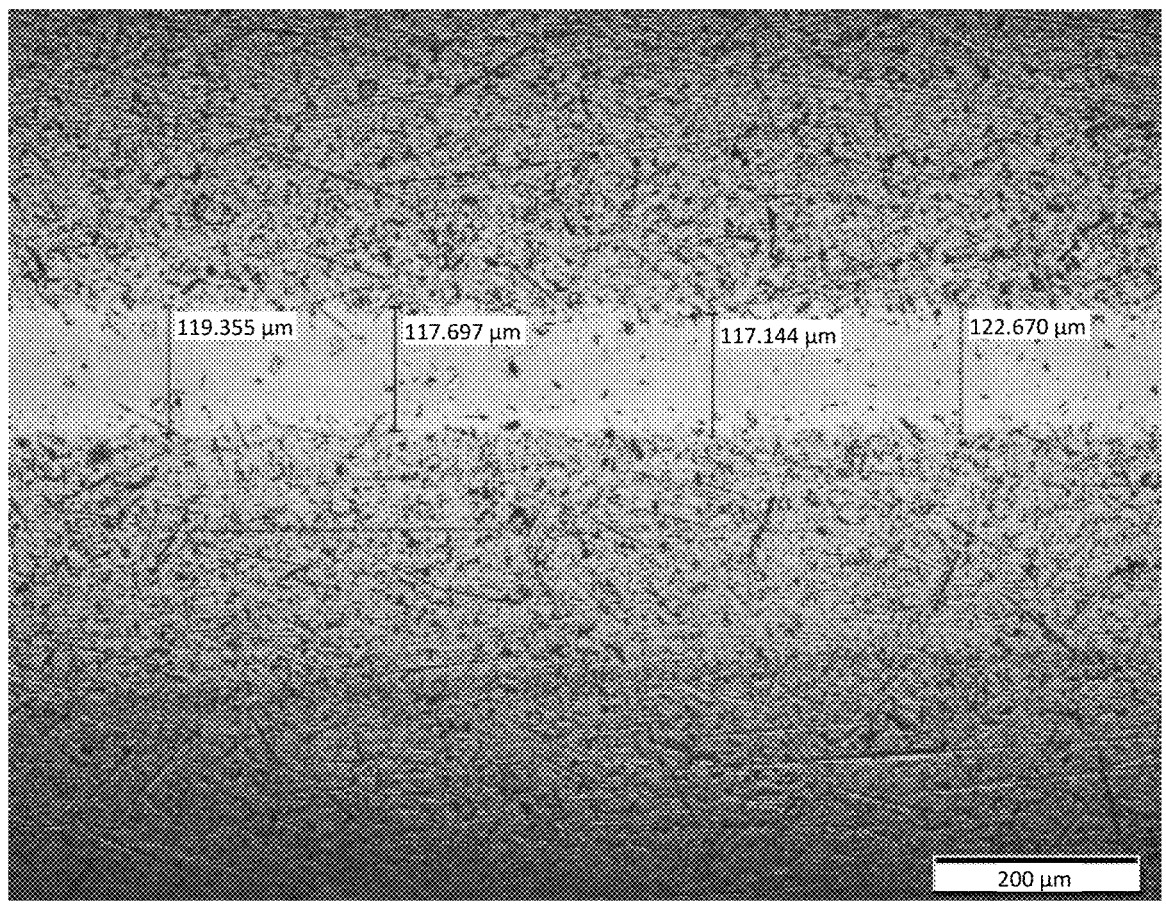
FIGS. 5C-5D show an embodiment of non-stoichiometric nitride coated steel surface and the results of the wear experiments with DOT 3-310 as the liquid lubricant.
Figure 5D:
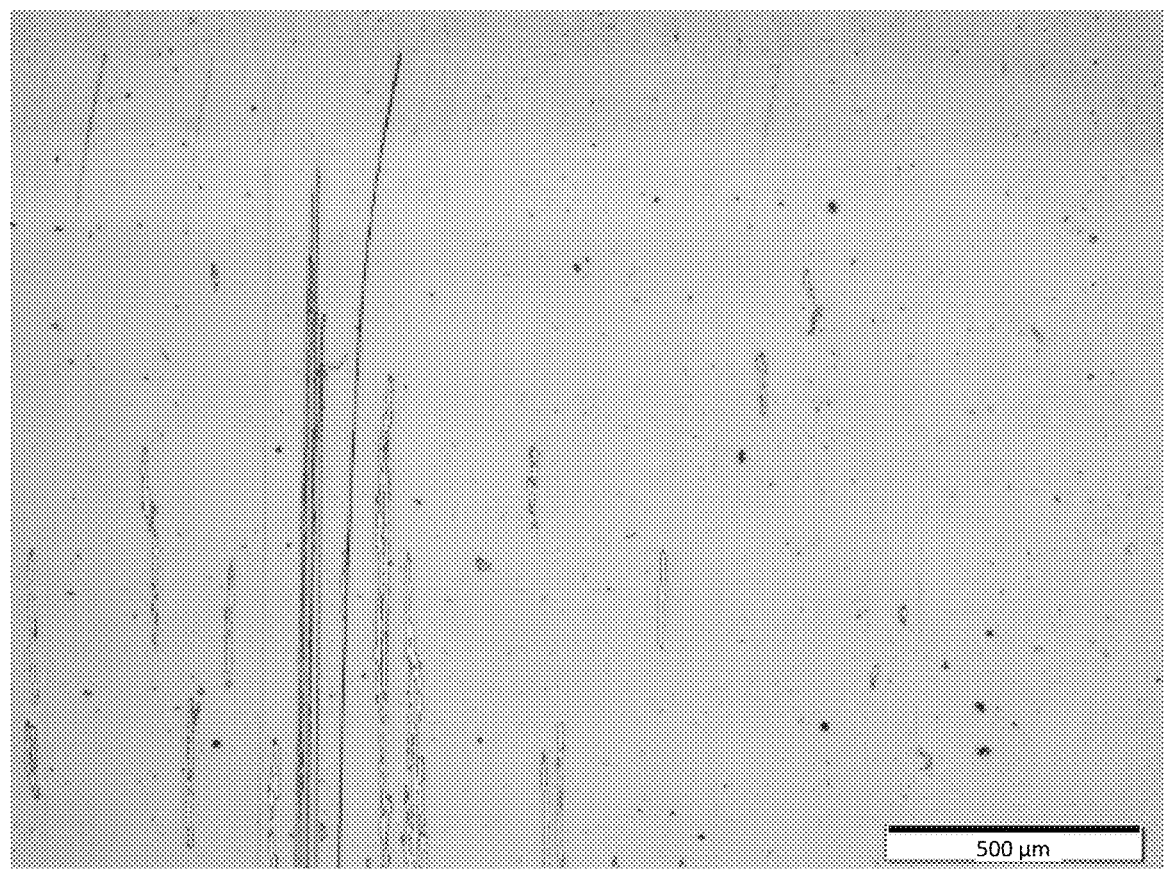

In another tested embodiment, the liquid lubricant was DOT 3, specifically Dot 3-310. FIG. 4 is a graph of the CoF over time for different combinations of materials with DOT 3-310 as the liquid lubricant. FIGS. 5A-5B show native, uncoated steel surface and the results of the wear experiments with DOT 3-310. FIGS. 5C-5D show an embodiment of non-stoichiometric nitride coated steel surface and the results of the wear experiments with DOT 3-310.

Figure 6:
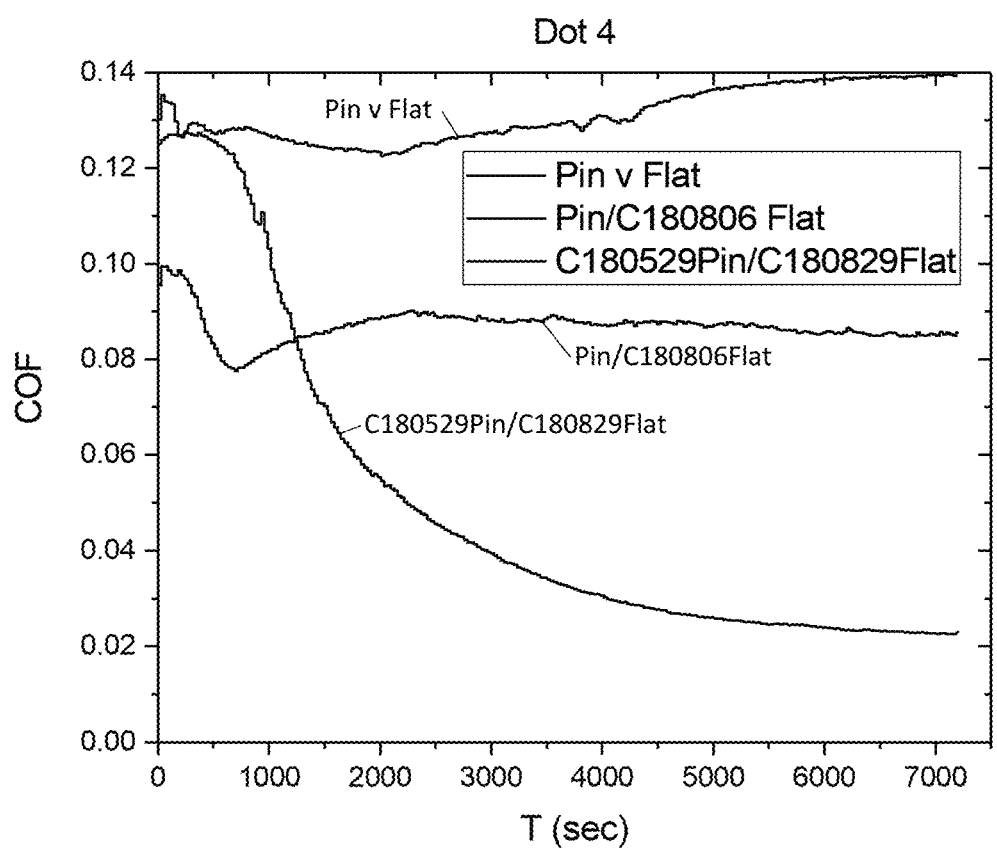
FIG. 6 is a graph of the CoF over time for different combinations of materials with DOT 4 as the liquid lubricant.
Figure 7A:
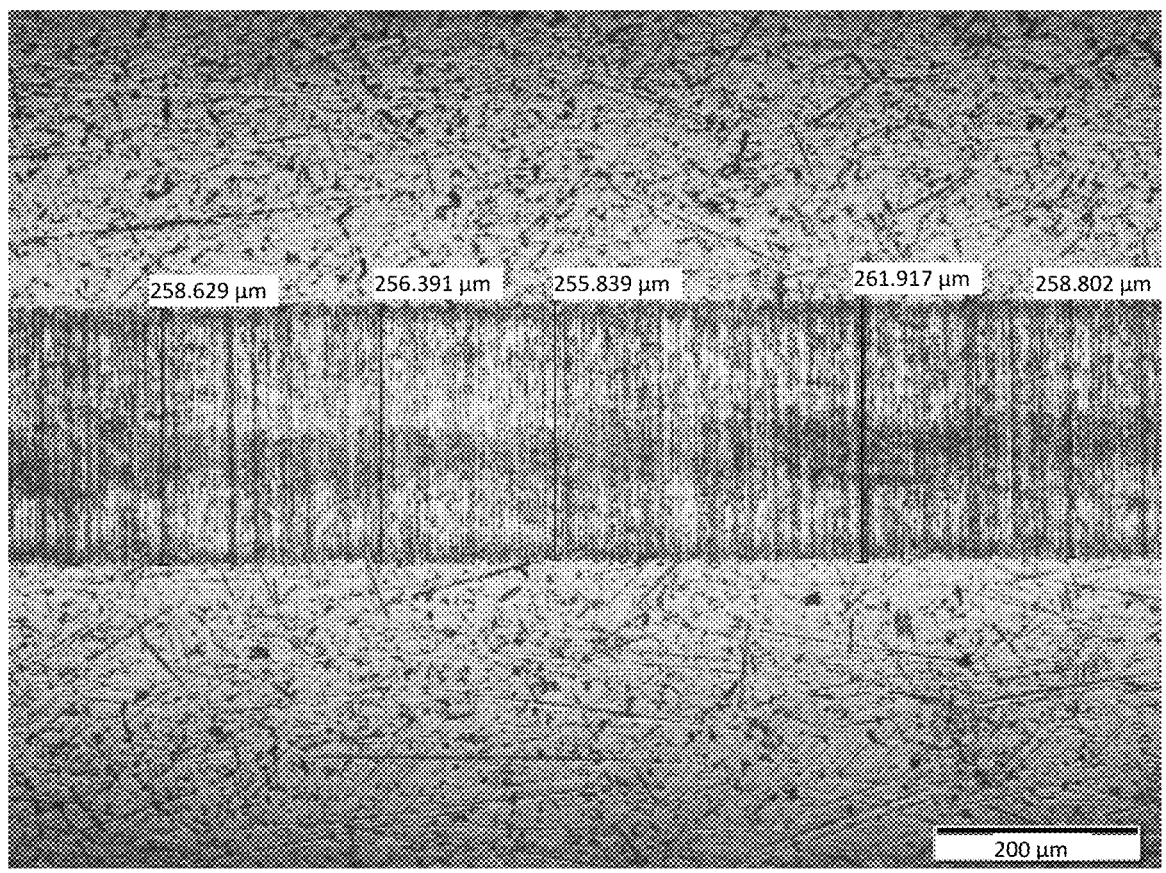
FIGS. 7A-7B show native, uncoated steel surface and the results of the wear experiments with DOT 4 as the liquid lubricant.
Figure 7B:
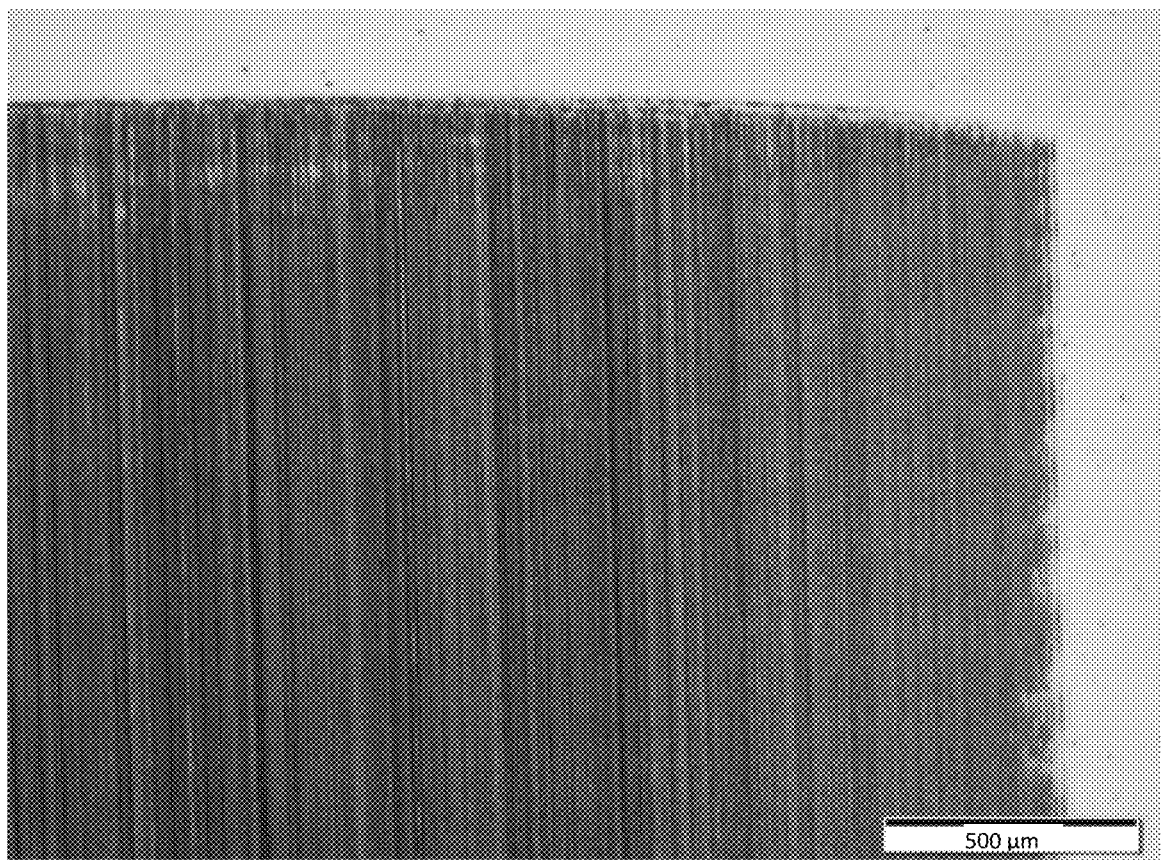
Figure 7C:
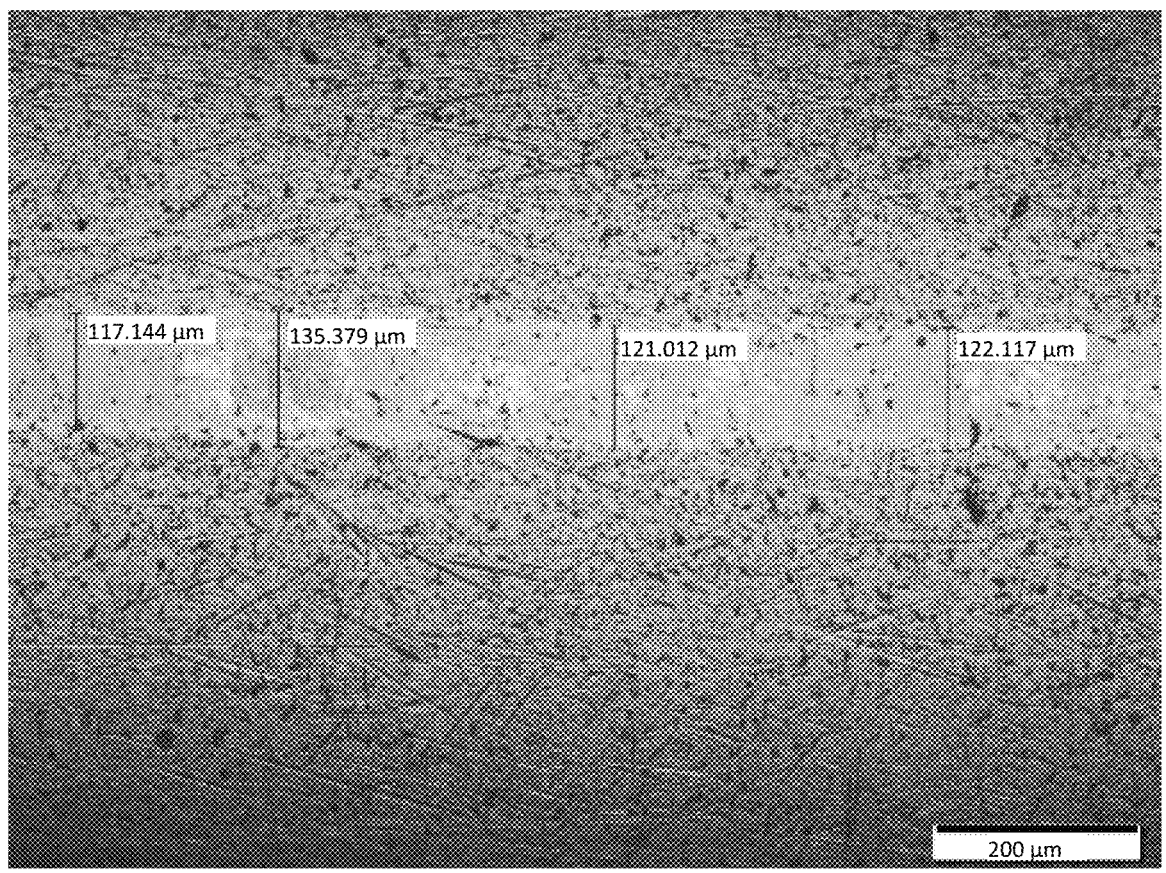
FIGS. 7C-7D show an embodiment of non-stoichiometric nitride coated steel surface and the results of the wear experiments with DOT 4 as the liquid lubricant.
Figure 7D:
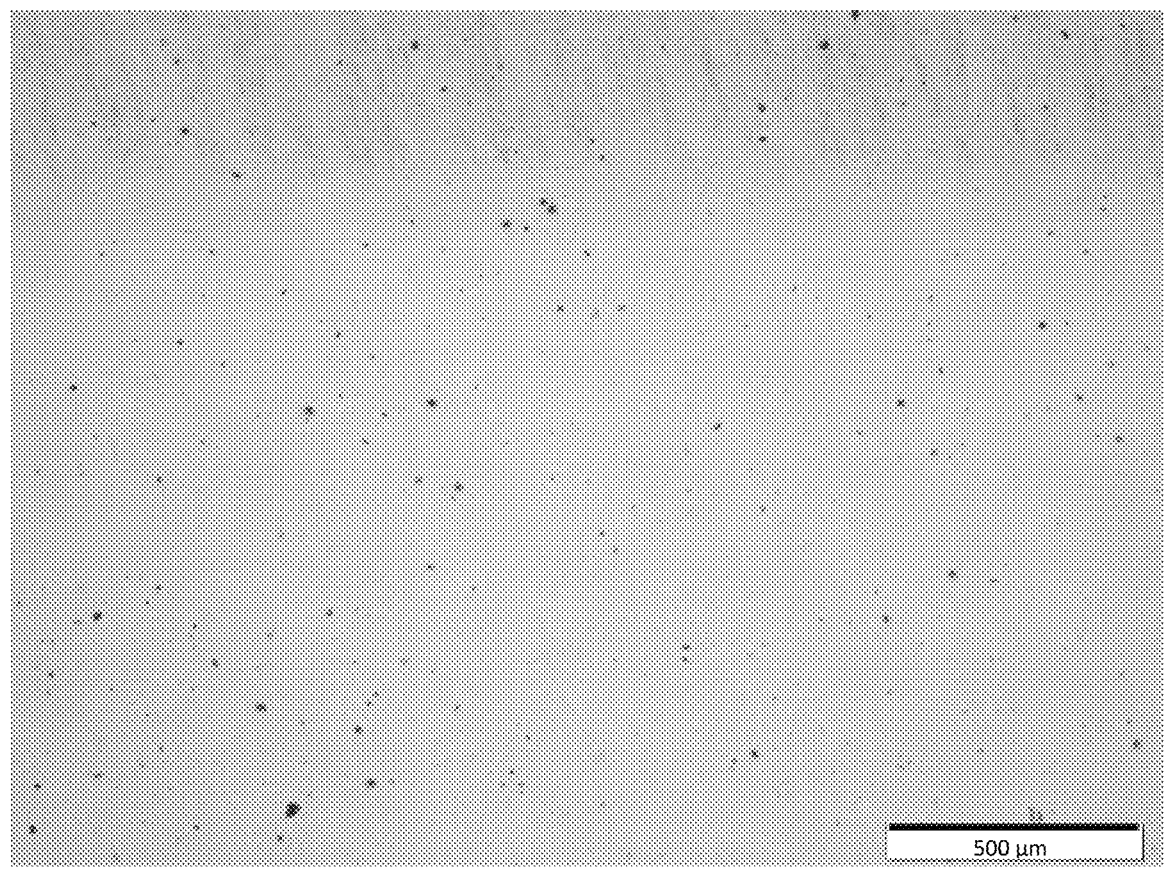

In another tested embodiment, the liquid lubricant was DOT 4. FIG. 6 is a graph of the CoF over time for different combinations of materials with DOT 4 as the liquid lubricant. FIGS. 7A-7B show native, uncoated steel surface and the results of the wear experiments with DOT 4 as the liquid lubricant; FIGS. 7C-7D show an embodiment of non-stoichiometric nitride coated steel surface and the results of the wear experiments with DOT 4.

DEFINITIONS

As used herein, the singular forms "a", "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The invention claimed is:

1. A super lubricious apparatus comprising:
    a substrate;
    a nanocomposite coating on the substrate, the nanocomposite consisting essentially of a matrix of a catalytically active element embedded in the matrix, the matrix selected from Cu, Ni, Pd, Pt and Re and mixtures thereof, and non-stoichiometric vanadium nitride grains;
    a hydrocarbon lubricant; and
    a carbon film disposed between the nanocomposite coating and the hydrocarbon lubricant.

2. The apparatus as defined in claim 1, wherein the catalytically active element is about 1% to 10% by weight and the grains are from about 90% to 99% by weight.

3. The apparatus as defined in claim 1, wherein the substrate is selected from the group of a metal and a ceramic.

4. The apparatus as defined in claim 1, wherein the substrate comprises a steel based material.

5. The apparatus as defined in claim 1, wherein the oil is essentially free of additives.

6. The apparatus as defined in claim 1, wherein the carbon film consists essentially of diamond like carbon.

7. A method for lubricating materials in wear contact, comprising the steps of:
    providing a base material;
    disposing a non-stoichiometric nanocomposite coating on the base material, the nanocomposite consisting essentially of about 1% to 10% by weight a microstructural matrix of a catalytically active alloy with about 90% to 99% by weight grains embedded in therein, the microstructural matrix selected from the group of Cu, Ni, Pd, Pt and Re and mixtures thereof and vanadium nitride grains;
    disposing an oil on the nanocomposite coating;
    engaging the nanocomposite coating with a surface, the oil disposed therebetween;
    cracking carbon bonds of the oil; and
    forming a carbon film disposed between the coating and the layer, thereby lubricating the nanocomposite coating and underlying base material.

8. The method as defined in claim 7, wherein the base material is selected from the group of a metal and a ceramic.

9. The method as defined in claim 7, wherein the base material comprises a steel based material.

10. The method as defined in claim 7, wherein the oil is essentially free of additives.

11. The method as defined in claim 7, wherein the carbon film consists essentially of diamond like carbon.

12. The method as defined in claim 7, wherein the grains are selected from the group of refractory metal carbides, carbo-nitrides, nitrides and borides.

13. The apparatus of claim 1, wherein the vanadium nitride hard grains are non-stoichiometric.

14. The apparatus of claim 1, wherein the catalytic soft grains are homogenously distributed on the nanocomposite coating.

15. The apparatus of claim 1, wherein the nanocomposite coating is non-stoichiometric.

\* \* \* \* \*